United States Patent
Gordon

[19]
[11] Patent Number: 5,947,790
[45] Date of Patent: Sep. 7, 1999

[54] LINE PLAY OUT AND RETRIEVAL DEVICE

[76] Inventor: Brian K. Gordon, 9 Bryant Dr., Livingston, N.J. 07039

[21] Appl. No.: 08/853,055

[22] Filed: May 7, 1997

Related U.S. Application Data

[60] Provisional application No. 60/017,861, May 8, 1996, and provisional application No. 60/017,094, May 9, 1996.

[51] Int. Cl.⁶ .................................................. A63H 33/00
[52] U.S. Cl. .................. 446/247; 242/390.8; 242/405.3; 119/707
[58] Field of Search ..................................... 446/266, 247, 446/484; 43/21, 26.1; 242/250, 225, 390.8, 405.3, 390.9; 119/707, 708, 711

[56] References Cited

U.S. PATENT DOCUMENTS

| | | |
|---|---|---|
| 902,447 | 10/1908 | Piper ........................................ 242/250 |
| 1,005,015 | 10/1911 | French ........................................ 43/21 |
| 2,494,952 | 1/1950 | Luton et al. ................................ 43/21 |
| 2,622,880 | 12/1952 | Walsh ................................... 473/576 X |
| 2,896,875 | 7/1959 | Reed et al. . |
| 3,064,385 | 11/1962 | Pickard . |
| 3,075,722 | 1/1963 | Stealy et al. . |
| 3,202,378 | 8/1965 | Williamson . |
| 3,252,239 | 5/1966 | Moeller . |
| 3,351,300 | 11/1967 | Nagy ........................................ 43/21 |
| 3,382,609 | 5/1968 | Neanhouse ............................... 446/484 |
| 3,461,603 | 8/1969 | Rowell ..................................... 446/215 |
| 3,593,940 | 7/1971 | Stanton .................................. 242/405.3 |
| 3,727,583 | 4/1973 | Muraro .................................... 119/707 |
| 3,784,125 | 1/1974 | Law et al. ................................ 242/225 |
| 3,822,839 | 7/1974 | Persichini ............................. 242/390.8 |
| 4,733,868 | 3/1988 | Seiden . |
| 4,803,953 | 2/1989 | Graves . |
| 5,004,181 | 4/1991 | Fowles ..................................... 242/225 |
| 5,088,657 | 2/1992 | Chen ........................................ 242/225 |
| 5,444,919 | 8/1995 | Alves ..................................... 242/390.8 |
| 5,467,740 | 11/1995 | Redwine ................................. 119/707 |
| 5,695,140 | 12/1997 | Goodman ................................ 242/250 |

FOREIGN PATENT DOCUMENTS

1009370  7/1983  U.S.S.R. .

*Primary Examiner*—Robert A. Hafer
*Assistant Examiner*—Jeffrey D. Carlson
*Attorney, Agent, or Firm*—Wechsler & Wechsler, P.C.; Lawrence I. Wechsler

[57] ABSTRACT

A hand-held device permits playout and retrieval of line with reduced incidence of tangling. A spool is drivingly connected a motor selectively energizable by the user. A line is receivable on the rotating spool for uptake in windings thereabout when the motor is energized during a retrieval operation. When the motor is not energized, and sufficient force is applied to the other end of the line, the spool rotates in a direction opposite to the rotational direction during uptake against the resting rotational resistance of the motor to permit unwinding and playout of the line. The device is conveniently wand-shaped, and includes a rear portion of the device defining a user grip, and a remaining head portion disposed forward of the hand when held. The spool is disposed inside the head portion. An opening provided in the head portion, is advantageously located in a position in the head portion between imaginary planes drawn through opposed ends of the spool and perpendicular to a rotational spool axis, the opening thereby orienting a portion of the line interior the device in a controlled direction relative to the spool axis irrespective of a direction of a counter force applied to the line.

14 Claims, 5 Drawing Sheets

LINE PLAY OUT AND RETRIEVAL DEVICE

CROSS REFERENCE TO RELATED APPLICATIONS

This application claims the benefit of the following U.S. Provisional Applications: Provisional Application No. 60/017,861 filed May 8, 1996 entitled PET TOY, and Provisional Application No. 60/017,094 filed May 9, 1996 entitled MOTORIZED TANGLE PROOF TOY.

BACKGROUND OF THE INVENTION

The present invention relates to a device for playout and retrieval of a length of line, and more particularly a hand-held device which permits casting of a line-tethered weight and subsequent retrieval of same in a manner permitting performance of a variety of deeds and stop-and-go maneuvers, providing entertainment to the user and/or the user's pet.

Many known devices directed to playout and subsequent retrieval of line-tethered weights have heretofore provided a user with amusement and entertainment. One such device is the well known yo-yo, which, with practice, permits the user to perform a multitude of "tricks" by alteration and refinement of various casting and retrieval techniques. The body of the yo-yo, which itself comprises the tethered weight, is provided in the form of two halves interconnected by a spindle, about which a string attached thereto winds between the two halves. The other end of the string is looped around the user's finger, thereby permitting the user to release the yo-yo to effect a casting thereof, while control of the string to which the yo-yo is tethered is maintained, and to catch the body of the yo-yo when rewinding of the string is complete and the yo-yo is returned to the hand of the user. In a "sleeper" type yo-yo, which is generally preferred for use in performing tricks in addition to simple downward unwinding and immediate rewinding, a length of line is doubled back on itself and twisted together to form double stranded string in which a closed loop is formed at one end thereof. The yo-yo spindle is made to pass through the loop and is thereby rotatably and captively held tethered to end of the twisted string. By altering the degree of twist in the string, the rotational friction exerted on the spindle by the looped string can be selectively altered by the user. When used properly, such looped string configuration permits the yo-yo to captively rotate within the loop when the string is fully unwound by virtue of rotational inertia imparted to the body of the yo-yo by a downward casting thereof and attendant unwinding of the string relative thereto. In such manner, the body of the yo-yo needn't be immediately rewound and retrieved following unwinding, as in the case where the string is non-rotationally attached to the spindle. As long as the body continues to rotate at sufficient speed, it can be retrieved by a sudden upward pull on the string, which serves to apply increased loop friction sufficient to begin a rewinding powered by the stored rotational inertial energy in the yo-yo body. The satisfaction that comes with performance of practiced feats makes the yo-yo an entertaining toy not only for the user, but also observers as well. Its advanced use, however, requires coordinational skill not necessarily possessed by all, and may require practice considered by many to be too time consuming.

Other devices designed to playout and retrieve a line to which a weight is tethered have also be suggested for use in interplay with pets, for amusement of both pet and owner alike. Such devices generally employ a propellable weight fashioned as an attractively colored or shaped lure which may be retrieved in a desired manner to create interest in the animal attempting to chase the moving lure. Generally, in these devices, the line to which the weight is tethered is attached to a spool, the rotation of which, by a motor or other drive means, winds the line thereabout to retrieve the weight following casting thereof by any of various means.

A matter of particular concern with regard to the devices of the type described above is the danger of tangling of the line about, or apart from, the winding spool, or the occurrence of an unwanted unraveling, i.e. line slipping over the ends of the spool (as distinguished from a normal unwinding from a rotating spool) which could increase the likelihood of line binding and consequently inhibit desired operation. In general, the playout and retrieval devices in the prior art, for example most conventional fishing reels, are provided with exposed spools, thereby providing user access to the wound line should tangling occur, and enabling the user to correct the problem and restore the unit to an operational state. The prior art, however, offers little or no suggestion of a means by which tangling may be minimized or prevented, a feature of particular importance in a device in which the spool is not readily user accessible.

As noted above, many of the problems encountered in playout and retrieval operation is commonly addressed in the fishing reel arts, where many advances have been directed to providing for even winding of the line about the spool portion of the reel during retrieval, such as when checking bait, or landing a fish, which might otherwise result in improper subsequent line playout. However, during actual casting (playout) operation, tangling is a problem frequently encountered notwithstanding properly wound line, and is minimized primarily as a function of the developed skill of the angler. Moreover, casting of a fishing line which is always directed along the length of the pole to which the reel is attached does not offer solutions to the unique problems of line tangling potentially occurring in a device, such as a toy for amusement, in which the playout direction relative the orientation of the device may be randomly selected by the user.

It would therefore be desirable to provide a device which permits the playout and retrieval of a length of cord in which the incidence of tangling is reduced to permit effective and reliable repeated operation even when a playout or retrieval direction is randomly selected by the user, and which incorporates features which obviate, if so desired, the traditional practice of disposing the spool in an exposed position.

OBJECTS AND SUMMARY OF THE INVENTION

Accordingly, it is an object of the invention to provide a device for playout and retrieval of a line-tethered weight which overcomes the drawbacks of the prior art.

It is a further object of the invention to provide a device for playout and retrieval of a line-tethered weight which is adapted to multiple embodiments providing amusement to a user of same and/or the user's pet.

It is a still further object of the invention to provide a device for playout and retrieval of a line-tethered weight which permits simple, hand-held operation, and minimizes line tangle or binding even during repeated operation.

It is yet a further object of the invention to provide a device for playout and retrieval of a line-tethered weight which, by virtue of the features embodied therein, permits disposition of all mechanical parts within an enclosed housing.

Briefly stated, there is provided a hand-held device in which a spool is drivingly connected to a drive means, conveniently a motor, the latter being selectively energizable by the user. A line is receivable on the rotating spool for uptake thereon in windings thereabout when the motor is energized during a retrieval operation. When the motor is not energized, and sufficient force is applied to the other end of the line, the spool rotates in a direction opposite to the rotational direction during uptake against a resting rotational resistance of the motor to permit unwinding and playout of the line. The force sufficient to overcome the resistance of the disengaged motor is provided conveniently in the form of a weight tethered to the other end of the line, and advantageously having sufficient mass to overcome the resistance of the disengaged motor when acted upon by the downward pull of gravity, or alternatively, momentum imparted to the weight by centrifugal force or by other user arm motion, effecting a casting thereof in a random direction selected by the user. Such weight is however light enough to be effectively retrieved by operation of the motor when energized. A housing advantageously encloses the motor and spool, and includes a compartment for receiving a battery source for powering the motor during line retrieval. The housing is conveniently of a shape permitting facilitated gripping thereof in a user's hand. An opening is provided in the housing in a position substantially between imaginary planer extensions of opposed ends of the spool, through which the line may pass with sufficient clearance to prevent any significant binding thereof. To further minimize the likelihood of tangling, the line is advantageously of a material which possesses minimal memory characteristics, i.e. subtle enough so as not to retain curling due to repeated or extended term winding about the spool which might otherwise encourage tangling.

An embodiment in accordance with the invention is directed to a toy for use in providing a means for interplay between a pet, commonly for example a cat, and its owner. The includes a housing, conveniently wand shaped, a rear portion of which defines a user grip, and a remaining head portion being disposed forward of the hand when held. Drive means, conveniently in the form of a motor disposed in-line with a spool drivingly connected therewith is mounted in the housing, the spool being disposed inside the housing head portion. The motor is selectively energizable by the user by externally disposed switch means, conveniently provided in button form in a position along the housing, which permits thumb, finger or palm operation by the same hand in which the device is held. An opening is provided in the head portion, advantageously disposed in a position substantially between opposed ends of the spool and disposed on a side of the housing facing downwardly when held in the intended manner, the opening being large enough to allow free pass through of a line connected to the spool, yet small enough to prevent excessive lateral line play. In such manner, the opening operates as a pivot point when tension is applied to the line in a direction other than normal to the rotational axis of the spool, redirecting the course of the line internal of the housing to a direction close to normal the spool axis, thereby preventing unraveling of the line over the ends of the spool and attendant tangling which might otherwise occur. As noted above, the line characteristics advantageously include low deformation memory, such as exhibited by, for example, commercially available thin braided nylon lines. In the embodiment, a weight tethered to the free end of the line is fashioned in a shape providing both function and attractiveness to a cat or other predatory animal stimulated by moving objects. For example, the weight may be in the shape of a ball, etc., and include feathers or other colored and textured accessories, or may take the overall shape of a mouse or other eagerly sought prey. In the preferred case, the weight is of sufficient mass to permit the resistance of the motor, when not actively energized, to be overcome merely by the effect of gravity, yet being light enough to permit subsequent weight retrieval by powered rotation of the motor driven spool when energized by the user. Means are advantageously provided for holding the weight, which would normally drop to the ground without motor activation or separate from the housing during storage or periods of inactivity, to the housing, conveniently in the form of cooperating mounting elements carried on the weight, and on the housing, advantageously in a position proximate the line pass-through opening for minimization or elimination of exposed line between the weight and housing. During use, the wand shaped device is held in the hand, and the weight detached from its mounted position on the housing. While holding the weight, the user depresses the activation button and the weight is held, by operation of the motor, against the housing. The weight may then be released vertically downward by the effect of gravity when the button is released, or cast in a user selected direction away for the user by a suitable casting motion of the arm and a simultaneous release of the activation button. During such line playout, the spool rotates against the resting (non-energized) torque of the motor, which damps the rotation the spool, thereby minimizing overspin should the weight come to rest and slack be created in the line. The weight may then be retrieved by depression of the activation button which energizes the motor, winding the played out line about the spool. Activation by the user may be either continuous or intermittent to achieve the desired retrieval effect.

In another embodiment, a device of analogous construction is directed to entertainment of a user, by permitting various practiced games and tricks to be performed by a combination of arm movements and timed release and energization of the drive means, to achieve visual feats of similar complexity to those performed by yo-yo users. The embodiment does not require a weight having visual appeal to an animal, rather, that the weight be of a desired size and shape for handling by the user and to permit enhanced viewing by the user and any bystanders observing the performance of any trick performed thereby.

In an advantageous embodiment, the housing as described above includes means for gaining simplified access to the spool in the event user maintenance is required. This is accomplished conveniently by providing the housing with a hinged or snap-on removable connection between the grip portion and the head portion, which permits the head portion to be opened, thereby exposing the spool disposed therein. The line pass-through opening is advantageously a short slot formed in the forward edge of a portion of the housing abutting the edge of the head portion when hinged in closed orientation against the remainder of the housing. When closed, the slot is fully bounded by the surrounding structure of the grip and head portions, but permits the spool and line attached therethrough to be slidably removed from the housing and subsequently replaced if so desired, obviating rethreading of the line through the pass-through which would otherwise be required if the opening were a hole rather than an open slot.

In a further embodiment, the housing may be fashioned in the shape and design of a character or other physical representation, to increase the visual and decorative appeal of the overall device when held in the hand. For example, the grip portion of the housing may be made to resemble the body of a cat, with the head portion thereof containing the likeness of the cat's face thereon. To this end, and depending upon the purpose for which the particular device embodiment is directed, many suitable shapes and configurations may be adopted without departure from the intended scope of the invention as disclosed and claimed herein.

In yet another embodiment, the device as described above may be offered as a kit, comprising in combination with the hand-held device, a target or other object that can be used to gauge the proficiency of the user, or competitive users, of such devices.

It is further noted, that the above described device may be used to control the flight of user controlled aerial toys such as kites and model airplanes tethered thereto by a line, by permitting playout and retrieval of the objects restrained thereby.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

The present invention is directed to a hand-held device which permits playout and retrieval of a line-tethered weight for purposes of providing entertainment to the user, as well as observing human and animal companions, by various spontaneous and practiced techniques of use. The various embodiments and uses of the device extend to use as an pet toy for user interaction therewith, as a device for performing yo-yo-like feats, for control of line-tethered weights such as model aircraft flown in circular paths as well those of linear travel such as kites, and any other conceivable purpose for with such a device may be found useful. The features incorporated in such device are directed to avoidance of tangling of the line during repeated use. As depicted in the figures, and described below with reference thereto, the various embodiments are directed primarily to a device for interplay with animals, the particular choice being selected for purposes of economy, since all of the above stated intended uses of the various embodiments involve a device of the same basic construction and design. Any variations from the animal toy example depicted are explained in the description that follows.

Figure 1:
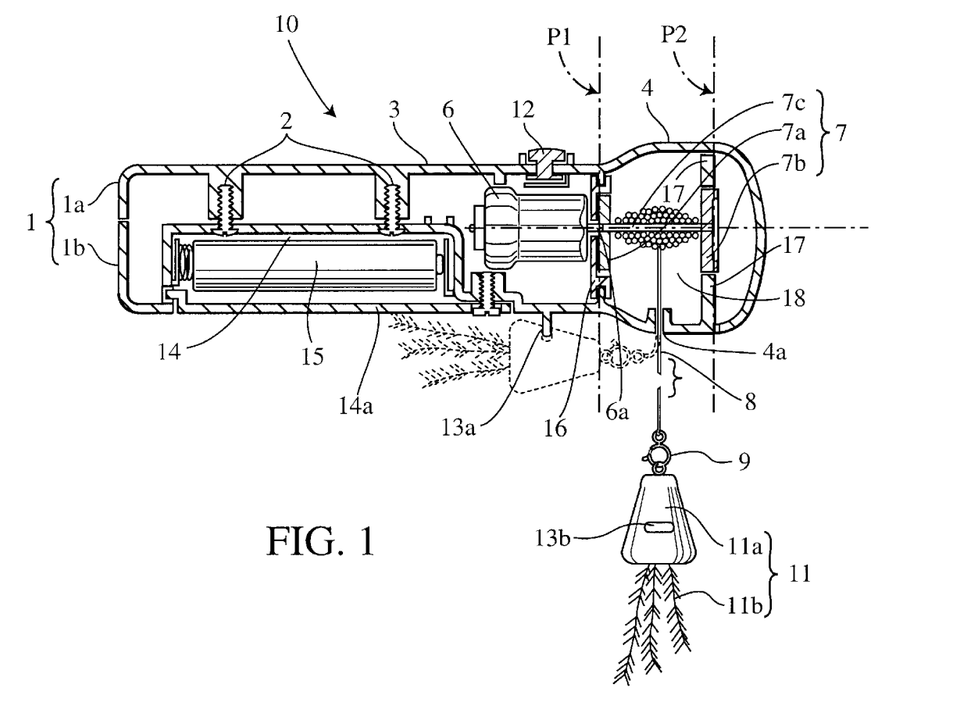
FIG. 1 is cross-sectional view of a device for line playout and retrieval of a line-tethered weight in accordance with an embodiment of the invention directed to interplay with a pet.
Figure 2:
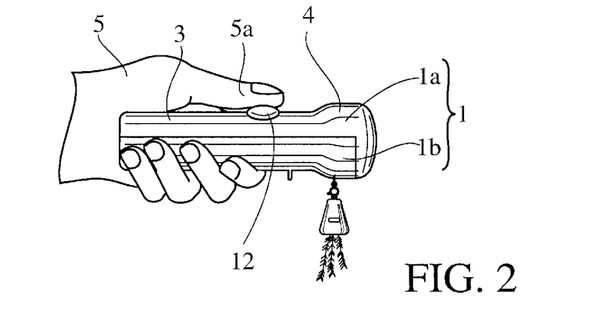
FIG. 2 is a perspective view of the device depicted in FIG. 1 shown properly gripped by a hand of a user thereof.

Turning now to the figures, and in particular FIG. 1, a device for playout and retrieval of a line-tethered weight, is shown, generally designated 10. Device 10 includes a housing 1 conveniently provided in a form comprised of an upper half 1a and a lower half 1b, attached to one another by suitable means, for example screws 2, to advantageously form a substantially or entirely enclosed structure in which the various operational components of device 10 are disposed. Housing 1 is conveniently wand shaped, a rear portion of which defines a user grip 3, and a remaining head portion 4 being disposed forward of a user's hand 5 when held, typically as shown in FIG. 2. Various operational components include drive means, conveniently provided in the form of an electrically powered motor 6 drivingly connected, for example, by in-line disposition with a forwardly positioned spool 7. By advantageously enclosing the structure of housing 1, operation of device 10 is not affected by otherwise troublesome exterior mechanical influences directed at the aforementioned operational components.

In the embodiment as depicted, spool 7, disposed in head portion 4, is comprised of rear and forward spool retaining ends 7a and 7b, respectively, and a spindle 7c which extends therebetween. Spindle 7c is either an extension of an axle 6a of motor 6, or is fixably attached thereto in axial alignment therewith. To discourage tangling of the line during playout and retrieval, spool 7 is advantageously shielded from motor 6 and from a forwardmost interior of housing 1 by a rear retaining wall 16 and a forward retaining wall 17, respectively. Rear retaining wall 16 has a central hole to permit pass through of Motor axle 6a, and is configured to rotatably receive spool end 7a within a circular countersunk region dimensioned to closely match the outer dimensions of spool end 7a, thereby reducing the likelihood that line 8 could become jammed therebetween, and consequently binding the operation of device 10. In a preferred case, spool end 7a is flush with the surface of rear retaining wall 16 surrounding the countersunk region thereof. In similar fashion, spool end 7b is rotatably received in close engagement, i.e. with minimal clearance thereabout, within a central bore formed in forward retaining wall 17, the surfaces of each preferably flush with one another. The central bore need not be a hole extending completely through retaining wall 17 as shown, but may alternatively be a countersunk region analogous to that formed in rear retaining wall 16. Rear retaining wall 16 and forward retaining wall 17 effectively create a line storage compartment 18, isolated from the rest of the interior of housing 1.

A line 8 is fixedly receivable at one end thereof on spindle 7c, for winding thereabout as spool 7 is rotated in a winding direction determined by rotation of the motor 6 when operated, in a position along spindle 7c advantageously spaced apart from both spool ends 7a and 7b. As winding about spool 7 is initiated, there is a natural tendency for line 8 to wind about both sides of a line connection point to spindle 7c. Therefore, in a more preferred case, the possibility of tangling caused by interference of line 8 with non-rotating elements disposed near spool ends 7a and 7b is reduced by connecting line 8 to spool at a midpoint between spool ends 7a and 7b. In any event, spindle 7c of spool 7 is sufficiently long to permit uptake of a desired quantity of line 8, such that when fully wound, line 8 does not reach the peripheral edge of spool ends 7a and 7b. A opening 4a in head portion 4 of housing 1 is provided to permit pass-through of line 8 to an exterior of housing 1. In the embodiment as depicted, opening 4a is conveniently disposed on a side of housing 1 facing downwardly when held in the intended manner as depicted in FIG. 2. Opening 4a is advantageously of a size large enough to allow free pass through of line 8 connected to spool 7 without significant binding thereof, yet small enough to prevent excessive lateral line play. For purposes of inhibiting tangling of line 8 during repeated playout and retrieval operations, opening 4a is advantageously disposed in a position between or proximate imaginary planes drawn through opposed ends 7a and 7b of spool 7 substantially perpendicular to a rotational axis of spool 7, and more advantageously in a plane perpendicular to a line attachment point to spindle 7c. In such manner, opening 4a operates as a pivot point when tension is applied to the line in a direction other than normal to the rotational axis of the spool, redirecting the course of the line internal of housing 1 to a controlled direction close to normal the rotational axis of spool 7, thereby discouraging unraveling of line 8 over ends 7a and 7b of spool 7 which might otherwise occur. With respect to line 8, it is noted that to further minimize tangling, the line characteristics advantageously include low deformation memory, i.e. subtle enough so as not to retain curling due to repeated or extended term winding about spool 7 which might otherwise encourage tangling. Suitable material includes, for example, various commercially available thin braided nylon lines.

Motor 6 is selectively energizable by the user, conveniently by button operated switching means 12, advantageously disposed in a position on housing 1 to permit operation thereof by a finger of the same hand 5 holding device 10, for example a thumb 5a when disposed in an upper position, as shown in FIG. 2. A switch can alternatively be disposed to permit palm activation when squeezed. When motor 6 is not energized, and sufficient force is applied to the end of line 8 to which weighted lure 11 is attached, spool 7 rotates in a direction opposite to the rotational direction during uptake, against the resting rotational resistance of motor 6, to permit unwinding and playout of line 8. The force sufficient to overcome the resistance of the disengaged motor is provided in the disclosed embodiment conveniently in the form of weighted lure 11 tethered to the other end of the line, advantageously having sufficient mass to overcome the resting resistance of the motor when acted upon by the downward pull of gravity, or alternatively, momentum imparted to weighted lure 11 by centrifugal force or by other user arm motion effecting a casting thereof in a random direction selected by the user. Such weighted lure 11 is, however, light enough to be effectively retrieved by operation of motor 6 when energized. It is noted that although the weight is disclosed, by example, as weighted lure 11, any suitable weighted object as determined by the particularly desired function to be performed by device 10 may be received on the free end of line 8, conveniently attached thereto in a manner permitting facilitated detachment as required, such as, for example by use of a provided slide clasp 9. In the embodiment as depicted, the particular weight is directed to interplay with a cat, and therefor takes the form of weighted lure 11 comprised conveniently of a body 11a and a feathered portion 11b for enhanced animal visual appeal. It is noted that motor 6 is selected for desired size, power, and rotational speed when energized, and additionally, for advantageously providing some degree of rotational torque when not actively energized, such that during playout of line 8, spool 7 is rotationally damped, thereby minimizing overspin and attendant tangling should weighted lure 11 come to rest and slack be created in line 8, while spool 8 would otherwise continue to spin.

It is noted that optional means may be provided for controlling the speed of the activated motor or other drive means, thereby controlling in turn the line uptake speed during retrieval. For example, button operated switching means 12, shown as a simple open-close switching mechanism, may be replaced by a pressure sensitive switch, the resistance across which decreases as more pressure is applied. Alternatively a slide potentiometer may be used in place of button operation to achieve a like result. Furthermore, the speed can be made selectable by a speed selection switch (not shown), provided in addition to button operated switching means 12, the various settings of which user-selectively set the desired motor speed when button operated switching means 12 is depressed during line retrieval.

Means are advantageously provided on housing 1 for holding weighted lure 11, which would normally drop to the ground without motor activation, or separate from housing 1 during storage or periods of inactivity, conveniently in the form of cooperating mounting elements carried on weighted lure 11 and on housing 1, advantageously in a position proximate the line pass-through opening for minimization of exposed line 8 between weighted lure 11 and housing 1. Such means are conveniently provided, for example, in the form of a protrusion 13a on housing 1, and a receiving groove 13b in which protrusion 13a is receivable in press-fit engagement. A twist lock arrangement is also a suitable choice for holding weighted lure 11 to housing 1. Other alternative means may also include any suitable fastener, such as, for example, snaps or hook and loop fastening means carried in an appropriate position on each of housing 1 and weighted lure 11.

Housing 1 further includes a compartment 14 for receiving a battery source 15 for powering motor 6 during line retrieval. Compartment 14 is accessibly sealed, conveniently by a removable door 14a which may be removed and replaced during servicing of battery source 15.

During use, wand shaped device 10 is held in the hand 5 and weighted lure 11 detached from its mounted position on the housing, as depicted in FIG. 2. While holding weighted lure 11, the user depresses activation button 12 and weighted lure 11 is then held, by operation of motor 6, against housing 1. Weighted lure 11 may then be released vertically downward by the effect of gravity when button 12 is released, or cast in a user selected direction away for the user by a suitable casting motion of the arm and a simultaneous release of activation button 12. During such line playout, spool 7 rotates and line 8 is unwound. Weighted lure 11 may then be retrieved by depression of activation button 12 which energizes motor 6, winding the played out line 8 about spool 7. Activation by the user may be either continuous or intermittent to achieve the desired retrieval effect.

Figure 3A:
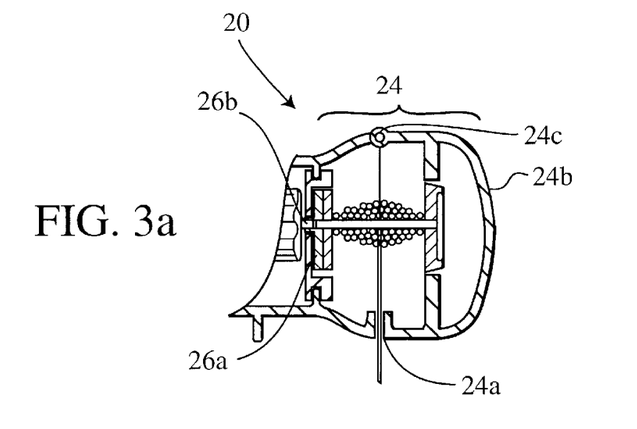
FIG. 3a is a detail side cross-sectional view of a device for playout and retrieval of a line-tethered weight in an embodiment in accordance with the invention providing simplified user spool access, shown in closed position for active use of the device.
Figure 3B:
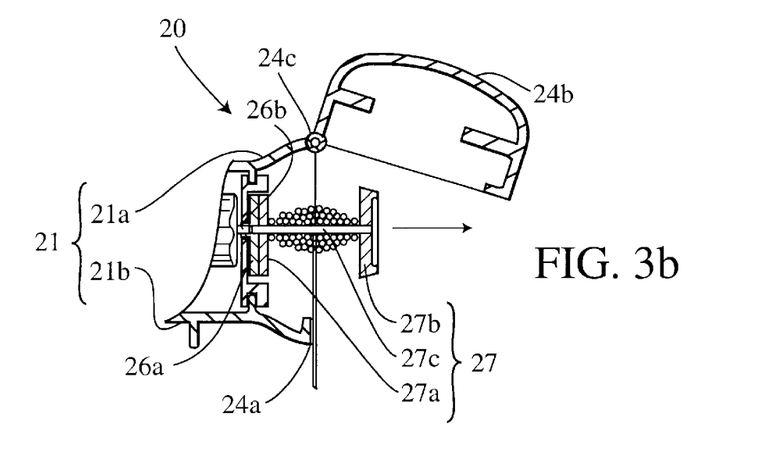
FIG. 3b is a detail side cross-sectional view of the device embodiment as depicted in FIG. 3a shown in open position providing user spool access through the forward portion of the device.
Figure 4:
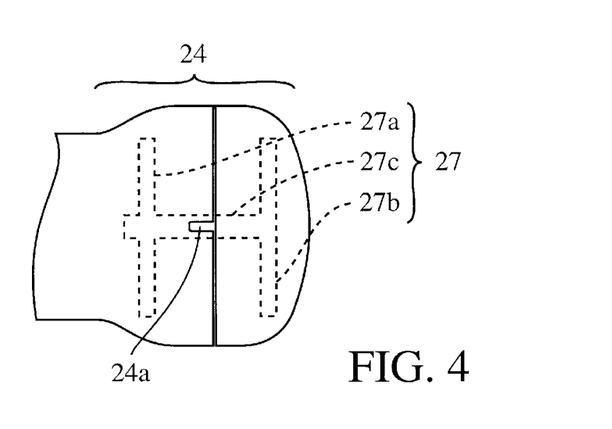
FIG. 4 is a bottom view of the device embodiment as depicted in FIGS. 3a and 3b, shown in closed position.

Turning now to FIGS. 3a and 3b, an embodiment is depicted in which simplified user access to the spool and wound line is provided, in the event user maintenance is required. The device, generally designated 20 is, except as noted below, of analogous construction to the previously described embodiment, and includes a housing 21, a rear portion of which defines a user grip (not shown), and a remaining head portion 24 within which a spool 27 is disposed. As in the previous embodiment, spool 27 includes rear and forward spool retaining ends 27a and 27b, respectively, and a spindle 27c extending therebetween. Similarly, housing 21 is conveniently provided in a form comprised of an upper half 21a and a lower half 21b, attached to one another by suitable means. In the embodiment, however, head portion 24 is of a configuration providing means for gaining access to spool 27. This is provided advantageously in a form permitting a front portion 24b of head portion 24 to be movable from a position in which it is engaged with a remainder of housing 21, to one in which is sufficiently clear of housing 21 to provide access to exposed spool 27, and optionally permit removal of same if so desired. In the embodiment as depicted, front portion 24b is hingably connected to a remaining portion of housing 21 by a hinge 24c disposed in suitable position, for example, at the top of head portion 24, to permit opening of housing 21 from a closed position as shown in FIG. 3a, to one in which spool 27 is at least partially user accessible, as shown in FIG. 3b. A line pass-through opening 24a is advantageously a short slot formed in the forward edge of housing 21 abutting the edge of front portion 24b of head portion 24 when hinged in closed orientation against housing 21. As shown in FIG. 4, when device 20 is in such closed position, slot-shaped pass-through opening 24b is fully bounded by the surrounding structure of front portion 24b and the remainder of the housing 21 against which it abuts. However, when front portion 24b is opened, such slotted structure permits spool 27, and line 28 attached thereto, and extending through slot-shaped pass-through opening 24b, to be slidably removed from housing 21 in the direction indicated by the arrow in FIG. 3b, and subsequently replaced if so desired, obviating rethreading of line 28 through pass-through opening 24b which would otherwise be required if pass-through opening 24b were a hole rather than an open slot.

In the embodiment, means are provided to permit removal and replacement of spool 27 from housing 21. This is accomplished conveniently by an end adapter 26a carried on an end of a motor drive shaft 26b. An end of spool spindle 27c protrudes past retaining end 27a is receivable in press-fit engagement in end adapter 26a. If so desired, and to prevent rotational slippage of spool 27 during operation, the receiving portion of end adapter 26a and the protruding portion of spindle 27c could advantageously include a longitudinal flat of matching configuration. Other means for permitting removable mounting of spool 27 may be practiced without departure from the intended scope of the invention as claimed, employing, for example, more elaborate structure, or utilizing set screws and the like.

In the above described embodiments, the spools 7 and 27 both include spool ends 7a, 7b and 27a and 27b, respectively, which are a fixed part of spools 7 and 27, and as such rotate along with spindles 7c and 27c. Their purpose is to retain wound line 8 and 28 respectively between ends of spindles 7c and 27c. However, in alternative embodiments, one or more of the rotatable spool ends may be replaced with non-rotational guard plates through which a spindle is rotationally received in close engagement. Two such embodiments are described below with reference to FIGS. 5 and 6.

Figure 5:
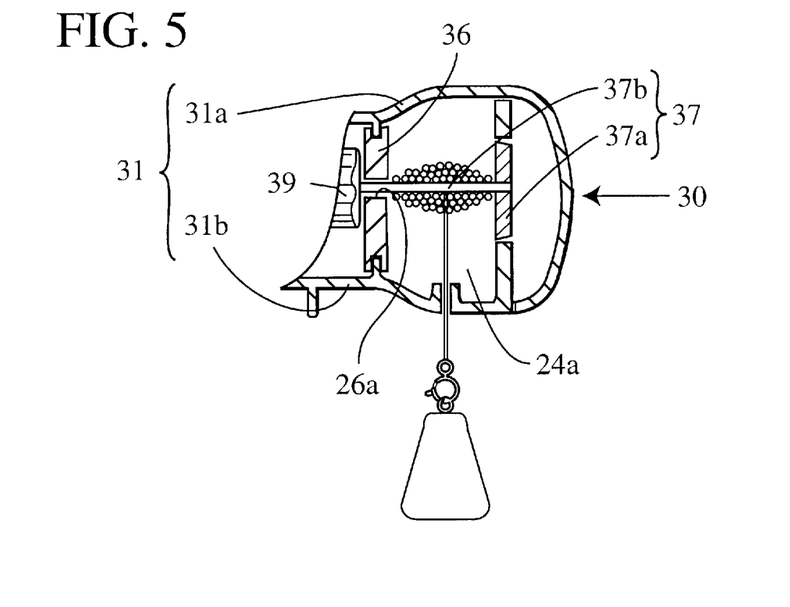
FIG. 5 is a partial side cross-sectional of another embodiment in accordance with the invention in which a spool having a T-shaped configuration is provided.

Turning first to FIG. 5, a device in accordance with an embodiment of the invention is shown generally at 30. The structure of device 30, is altered from that of the embodiment of FIGS. 1 and 2 only with respect to the spool design and the mounting thereof within the housing. A spool 37 is of a generally T-shaped configuration and includes a spindle 37b and a spool end 37a. Spindle 37a is an extension of the motor axle, or affixed thereto in axial alignment therewith, and extends through a clearance hole 36a (of advantageously minimal clearance fit) in a guard plate 36. Guard plate 36 is non-rotationally fixed to a housing 31 (in the embodiment as depicted, by compression between a top half 31a and a bottom half 31b of a housing 31), and functionally replaces spool end 7a and retaining wall 16 in the aforementioned embodiment, by enclosing a line storage compartment 38 and shielding a motor 39 from possible line tangling therewith.

Figure 6:
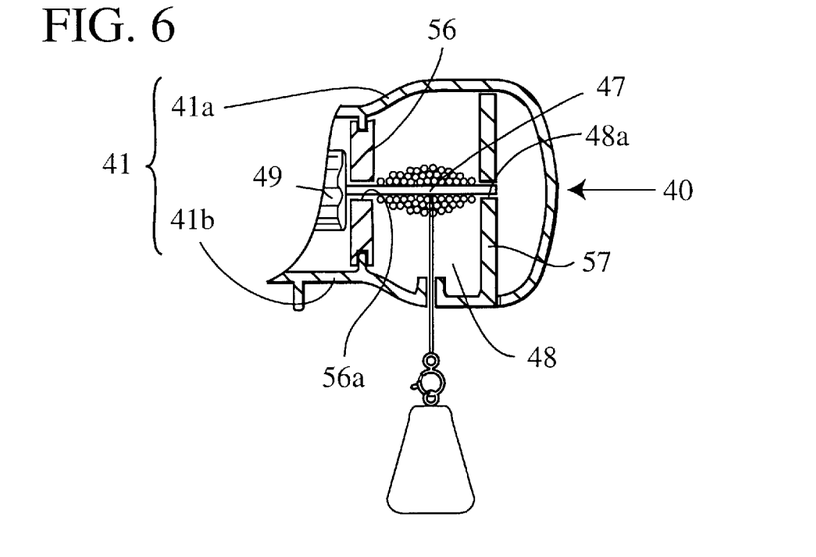
FIG. 6 is a partial side cross-sectional of another embodiment in accordance with the invention in which a spool having a spindle rotationally supported between two guard plates is provided.

Referring now to FIG. 6, another embodiment of a device in accordance with the invention is shown generally at 40. As in the previously described embodiment, structure of device differs from that shown in FIGS. 1 and 2 to the extent that spool configuration and mounting is altered. In the embodiment, both spool ends 7a and 7b are omitted, and a spool consists of only a spindle 47, which, for simplicity of construction, is conveniently an extension of an axle of a motor 49. A rear guard plate 56 is compressed between a top half 41a and a bottom half 41b of a housing 41, rendering it non-rotational with respect thereto. A clearance hole 56a is provided in rear guard plate 56 sized advantageously to permit close pass through of spindle 47 while not imparting rotational friction thereto. Spindle is sufficiently long to extend into an analogously configured clearance hole 57b provided in forward guard plate 57. Forward guard plate 57 is conveniently formed as an upward extension of housing bottom half 41b. Forward guard plate 57 and rear guard plate 56 together serve to enclose a line storage compartment 48, to provide the aforementioned tangle resistant features in accordance with the invention.

Figure 7:
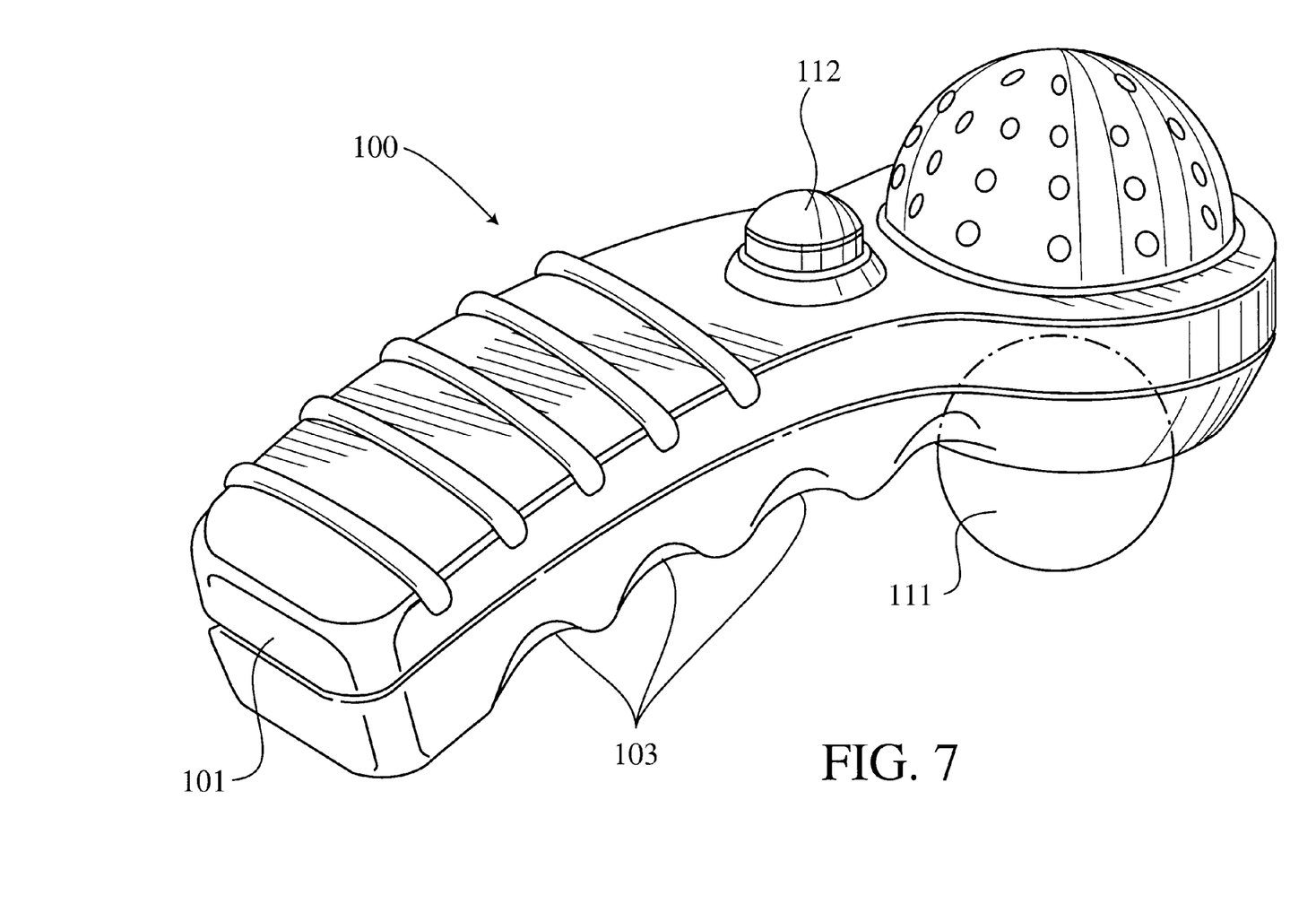
FIG. 7 is a perspective view of a device in accordance with an embodiment of the invention directed to personal user entertainment.

As noted herein, the device will find various other uses besides embodiment as a pet toy. For example, a device of analogous construction may be directed to entertainment of a user, by permitting various practiced games and tricks to be performed by a combination of arm movements, timed release, and energization of the drive means, to achieve visual feats of similar complexity to those performed by yo-yo users. Turning now to FIG. 7, an embodiment is depicted which is directed to such device, generally designated 100. Device 100 does not require a weight having visual appeal to an animal. Rather, the weight is of a desired size and shape for handling by the user and to permit enhanced viewing by the user and any bystanders observing the performance of any trick performed thereby, and is conveniently provided in the form of a ball 111. A housing 101 provides an optional formed grip 103, provided for enhanced user comfort, opposite an activation button 112, to conveniently permit thumb activation.

Figures 8, 9:
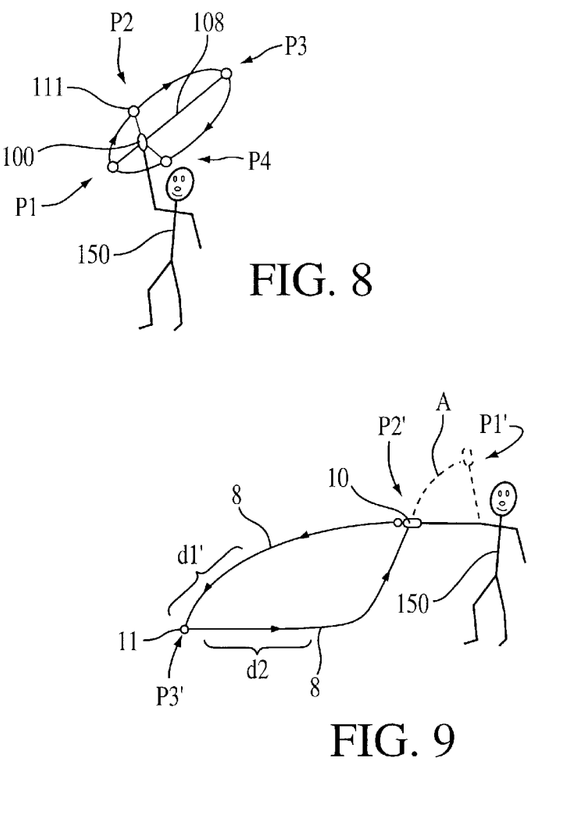
FIG. 8 is a schematic representation of an example of a method of entertaining use of a device in accordance with an embodiment of the invention.
FIG. 9 is a schematic representation of an example of another method of entertaining use of a device in accordance with an embodiment of the invention.

Examples of some of the various actions that can be performed by a device in accordance with embodiment of the invention are depicted in FIGS. 8 and 9. Referring to FIG. 9, an example of a trick which can be user performed using device 100 depicted in FIG. 7 is schematically represented. A user 150 holding device 100 can create an elliptical spin by selective activation and deactivation of device 100. At a point P1 in the cycle, device 100 is not activated, and line 108 begins to play out while acted upon by centrifugal force. As ball 111 reaches a next point P2 in the cycle, line continues to play out. When a next point P3 is reached, user 150 activates device 100 and line 108 is retrieved, and continues to be retrieved as ball 11 passes a point P4 in the cycle, device 100 continuing retrieval until point P1 is again reached, and device 100 deactivated.

Referring now to FIG. 9, use of device 10 as depicted in FIGS. 1 and 2 is schematically represented. User 150, holding device 10, lifts device 10 to a position P1' (shown dotted) while device 10 is activated, holding weighted lure 11 against the housing of device 10. Making a casting motion in the direction indicated by a dotted arc A, device 10 is brought to a position P2' at which point device 10 is inactivated, and weighted lure 11 is propelled to a position P3, and line 8 is played out in a direction d1 as indicated by arrow heads therealong. Line 8 is then retrieved in a direction d2 as indicated by arrowheads therealong by user activation of device 10.

Figure 10:
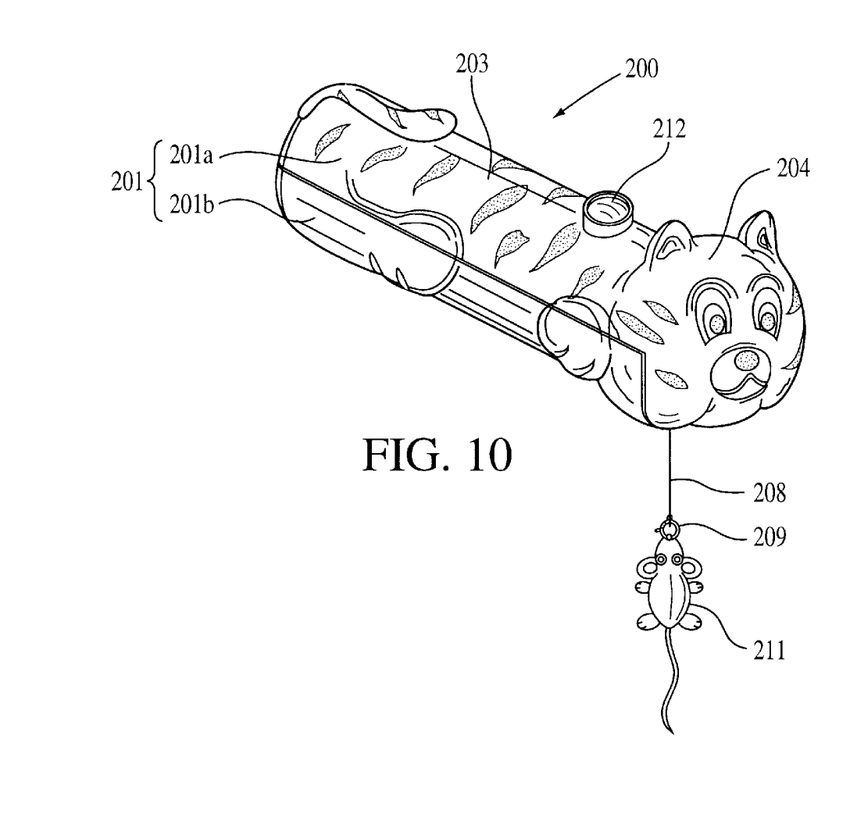
FIG. 10 is a perspective view of a device for playout and retrieval of a line-tethered weight in an embodiment in accordance with the invention directed to interplay with a cat in which the device housing and weighted lure are specially shaped to resemble a cat and mouse to provide enhanced user appeal.

In an advantageous embodiment, the device may be made to resemble a character or other physical representation, to increase the visual appeal of the overall device when held in the hand. Turning now to FIG. 10, and device in accordance with an embodiment particularly directed to interplay with a cat is shown, generally designated 200. Device 200 includes structure analogous to that described with reference to FIGS. 1 and 2, and includes a housing 201 including a grip portion 203 and a head portion 204, housing 201 being conveniently provided in bisected form including a top half 201a and a bottom half 201b. A motor activation button 212 permits user activation of device 200 by the users thumb. As depicted, device 200 is formed and optionally painted to resemble a character, in the present example the likeness of a reclining cat. A weighted lure 211 is removably connected to a line 208 by a clasp 209. As with housing 201, weighted lure 211 may also be fashioned to resemble a character, in the present example, a mouse, thereby increasing both user and animal appeal. It is to be understood that many other characters, including real and cartoon, may be substituted for the disclosed example. To this end, and depending upon the purpose for which the particular device embodiment is directed, many suitable shapes and configurations may be adopted without departure from the intended scope of the invention as disclosed and claimed herein.

As noted above, and as described with regard to the preceding embodiments, a device in accordance with invention advantageously comprises a fully enclosed housing. However, it is understood that embodiment of the invention can include a housing in which a spool and/or other components are partially exposed to provide user accessibility, without departure from the intended scope.

It is also noted, that the above described device may be used to control the flight of user controlled aerial toys such as kites and model airplanes tethered thereto by a line, by permitting playout and retrieval of the objects restrained thereby. It is further noted that the device as described above may be used as part of a target game in which a weighted lure includes means for adhering to a target surface for entertainment and to gauge the proficiency of the user, or competitive users, of such devices. For example, the weighted lure could be covered by looped fabric and the target surface coated with a hooked fabric, such as the cooperating elements of fastening means marketed for example under the trade name VELCRO®.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A hand-held device for user playout and retrieval of a length of line, said device comprising:

a housing having a handle portion defining a user hand grip, said housing further including a head portion, said head portion being disposed in a position along said housing unoccupied by said handle portion, said head portion and said handle portion oriented such that said head portion is located forwardly of the user's hand when said handle portion is gripped thereby;

drive means mounted within said housing for providing rotational output when activated;

activation means for selectively activating said drive means by engagement thereof, said activation means being operably accessible from an exterior of said housing;

a line;

a spool rotatably mounted within said housing proximate said head portion and drivingly connected to said drive means, an end of said line being secured on said spool and windable thereabout in response to an activation of said drive means, said line being unwound against a resistive resting torque of said drive means when said switch means is disengaged and a counter force sufficient to overcome same is applied to said line;

said head portion of said housing including an opening through which said line can slidably pass outwardly from said housing, said opening being located in a position in said head portion between imaginary planes drawn through points proximate opposed ends of said spool and perpendicular to a rotational spool axis, said opening thereby orienting a portion of said line interior the housing in a controlled direction relative to the spool axis irrespective of a direction of said counter force applied to said line; and means for facilitating user access to said spool comprising a portion of said housing defining an access opening in said head portion, and further comprising a front portion of said head portion mounted to a remainder of said head portion in a manner permitting movement of said front portion from a mounted position in which said front portion blocks said access opening to another position in which said front portion is sufficiently clear of said housing to permit user access to said spool, said front portion being hingably connected to said remainder of said head portion.

2. The casting wand according to claim 1, wherein said motor and said spool are disposed along a common rotational axis.

3. The casting wand according to claim 2, wherein said spool includes a spindle, and a rear spool end spaced a distance from an end of said spindle distant said motor.

4. The casting wand according to claim 3, further comprising:

a retaining wall disposed between said rear spool end and said motor, a side of said retaining wall facing said rear spool end having a bore extending at least partially through said retaining wall, said bore sized to permit at least partial reception of said rear spool end below a surface of said retaining wall surrounding said bore.

5. The casting wand according to claim 4, wherein said rear spool end is received in said bore a distance permitting a surface of said rear spool end facing away from said retaining wall to be substantially flush with said surface of said retaining wall surrounding said bore.

6. A casting wand for user single hand casting of a line-tethered weight, and for effecting retrieval of the line-tethered weight following casting, said casting wand comprising:

a line and a weight tethered thereto;

an elongated housing having a handle portion defining a user hand grip, said housing further including a head portion disposed adjacent a distal end of said housing, said handle portion being disposed between said head portion and a proximal end of said housing, oriented such that when said handle portion is gripped, said head portion is forward of a user's hand;

a motor carried in said housing;

switching means for selectively energizing said motor, said switching means being located on said housing for hand operation thereof by the user while retaining hand gripping of the handle portion;

a spool carried in the head portion of the housing to which a free end of said line is connected, said line being windable thereabout, said spool being connected to said motor to be rotatable therewith;

user manipulation of the housing to effect a casting of said weight with said motor de-energized causing said weight to be propelled in a casting direction, said housing including a housing opening through which said line can pass outwardly from said housing to effect unencumbered control of the line pass-out in said casting direction with attendant rotational unwinding of said line from said spool; and cooperating structure carried on each of said housing and said weight for removably securing said weight to said housing when said casting wand is not in active use, said cooperating structure including a protrusion carried on one of said housing and said weight and an indentation carried on a remaining one of said housing and said weight, said protrusion and said indentation being dimensioned to provide an interference fit therebetween when said protrusion is at least partially received in said indentation.

7. The casting wand according to claim 6, wherein:

said spool includes a spindle, and a front spool end and rear spool end between which said spindle extends; and said spindle and said front and rear spool ends are dimensioned to prevent a selected length of said line to reach a peripheral edge of each of said front and rear spool ends when wound about said spool.

8. The casting wand according to claim 6, further comprising:

means for controlling an operational speed of said motor when said switching means is activated.

9. The casting wand according to claim 6, further comprising:

means for facilitating user access to said spool comprising a portion of said housing defining an access opening in said head portion, and further comprising a front portion of said head portion mounted to a remainder of said head portion in a manner permitting movement of said front portion from a mounted position in which said front portion blocks said access opening to another position in which said front portion is sufficiently clear of said housing to permit user access to said spool.

10. The casting wand according to claim 6, wherein said cooperating structure carried on said housing for removably securing said weight thereto when said device is not in active use being positioned proximate said housing opening.

11. The casting wand according to claim 9, wherein:

said opening through which said line can slidably pass outwardly from said housing is a slot formed in the a forward edge of said housing, an edge of said front portion being configured to abut said forward edge when in said mounted position.

12. The casting wand according to claim 9, further comprising:

means for removably mounting said spool in said housing via said access opening.

13. A method for permitting user and animal interaction in which the animal chases a line-tethered lure, the line-tethered lure being castable by the user and subsequently retrievable by same, the method comprising the steps of:

providing a hand-held device which includes a housing, said housing having a handle portion defining a user hand grip, said housing further including a head portion, said head portion being disposed in a position along said housing unoccupied by said handle portion, said head portion and said handle portion oriented such that said head portion is located forwardly of the user's hand when said handle portion is gripped thereby, there being no additional structure extending forwardly of said head portion, said hand-held device further including drive means for providing rotational output when activated, activation means for selectively activating said drive means by engagement thereof, said activation means being operably accessible from an exterior of said housing, a spool rotatably mounted substantially within said head portion of said housing and drivingly connected to said drive means, a line and a lure tethered thereto, an end of said line away from said lure being secured on said spool and windable thereabout in response to an activation of said drive means, said line passing through an opening in said housing, a resistive resting torque of said drive means being small enough to permit said lure to be laterally propelled by a user casting arm motion while said line is rotationally unwound from said spool;

gripping said hand-held device by a hand of the user in a position along said housing such that said opening in said housing is free of the hand and positioned forwardly thereof;

activating said drive means while initiating said user casting arm motion;

deactivating said drive means at a latter portion of said user casting arm motion thereby causing the lure to be propelled away from said hand-held device to a landing position laterally distant from the user with attendant rotational unwinding of the line from the spool; and reactivating said drive means to retrieve said lure, motion thereof thereby eliciting animal interest.

14. The method according to claim 13, wherein said step of reactivating includes intermittent reactivation of said drive means for erratic retrieval.

* * * * *